Sept. 23, 1947. C. R. DRAY Re. 22,918

LOCK FOR GATES

Original Filed April 16, 1943 2 Sheets-Sheet 1

INVENTOR.
Charles R. Dray
BY Frank Keifer
ATTORNEY.

Sept. 23, 1947. C. R. DRAY Re. 22,918
LOCK FOR GATES
Original Filed April 16, 1943 2 Sheets-Sheet 2
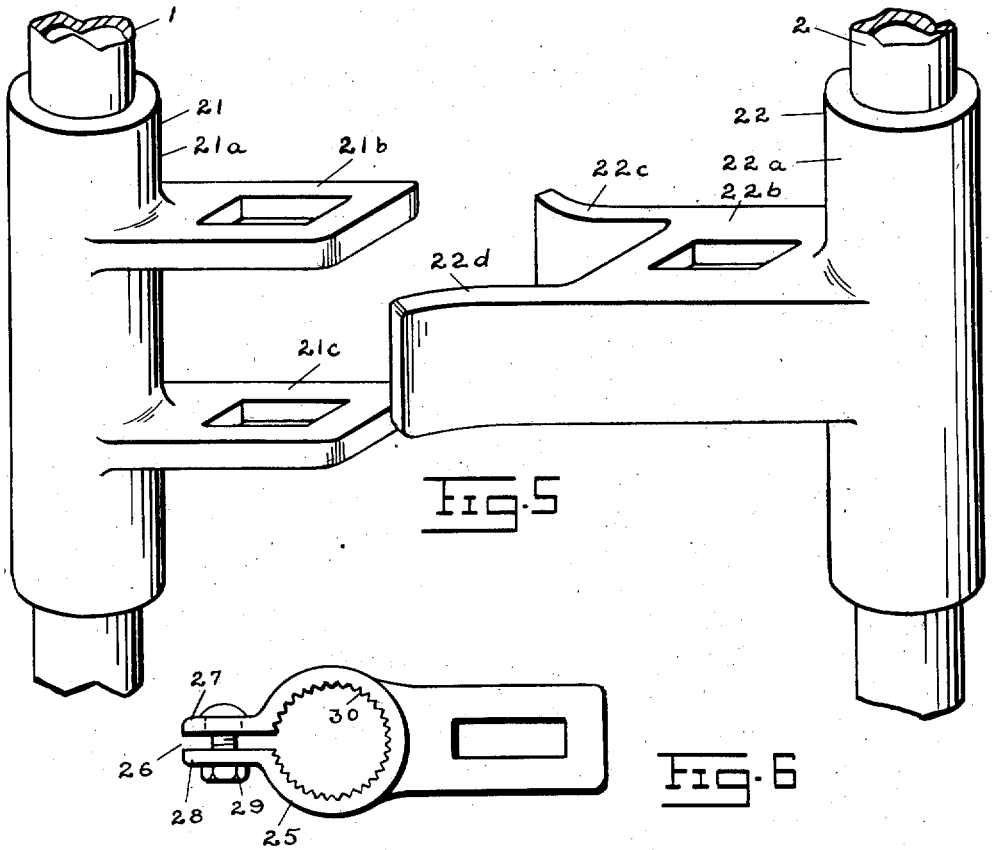
Fig. 5
Fig. 6
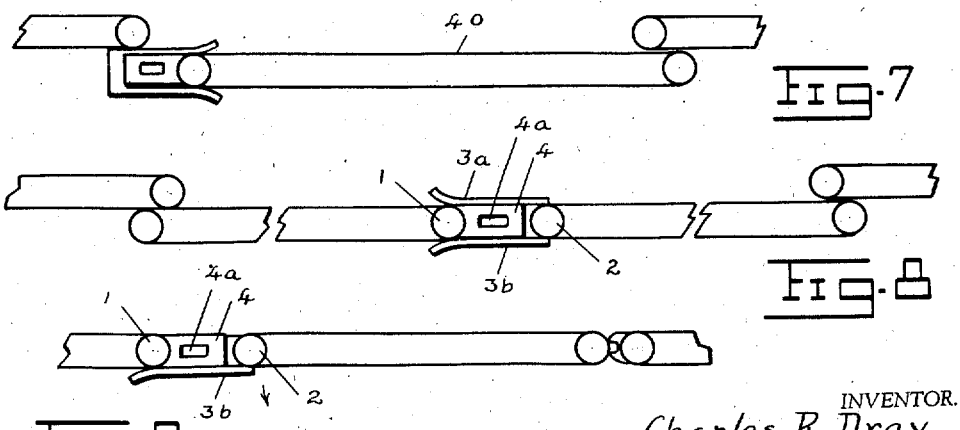
Fig. 7
Fig. 8
Fig. 9
INVENTOR.
Charles R. Dray
BY Frank Keifer
ATTORNEY.

Reissued Sept. 23, 1947

Re. 22,918

UNITED STATES PATENT OFFICE 22,918

LOCK FOR GATES

Charles R. Dray, Rochester, N. Y.

Original No. 2,358,914, dated September 26, 1944, Serial No. 483,290, April 16, 1943. Application for reissue August 18, 1945, Serial No. 611,360

8 Claims. (Cl. 292—148)

The object of this invention is to provide a new improved means for locking the end of one gate to the post or locking the ends of two gates together.

Another object of the invention is to lock the gate or gates with a bolt which bolt in turn can be locked in place in the lock with a padlock at one end or with a padlock at each end of the bolt.

Another object of the invention is to provide locking members on separate mounts which can be brought together for the purpose of locking them together and holding them together by a sliding bolt.

These and other objects of the invention will be illustrated in the drawings and described in the specification and pointed out in the claims at the end thereof.

In the drawings:

Figure 5 is a perspective view of a modified form of my locking device showing the locking members on the stiles of the gates made in the form of castings.

Figure 6 is a top plan view of a modified form of the part 21 which modification can also be applied to the part 22.

Figure 7 is a diagrammatic view of my locking device applied to a single sliding gate.

Figure 8 is a diagrammatic view of a double sliding gate.

Figure 9 shows a modified form of one of the locking members of Figure 5, namely partly mutilated so that it can be used on a swinging gate swinging against a fixed post or on a swinging gate swinging against the stile of a fixed gate.

In the drawings like reference numerals indicate like parts.

Figure 1:
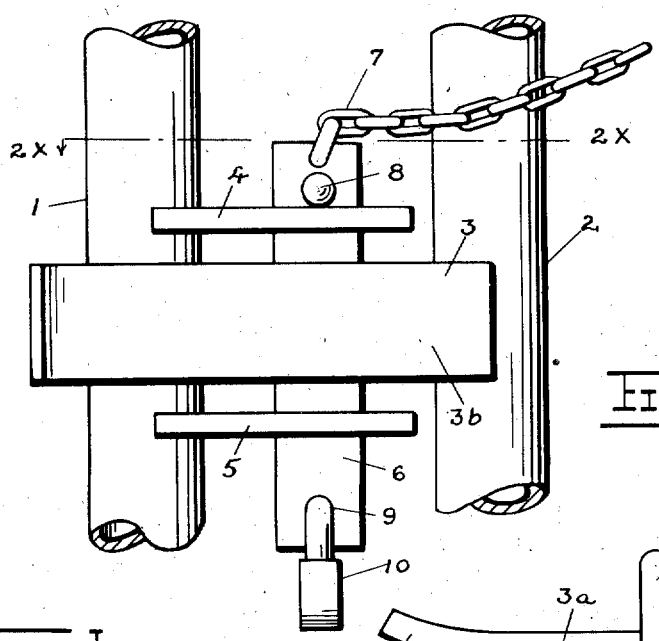
Figure 1 is a front elevation of the lock stile of two gates partly broken away showing the members of the lock mounted thereon and in locked position.

In the drawings reference numerals 1 and 2 indicate the lock stiles on a pair of hinged or swinging gates or on a pair of sliding gates or on a pair of gates in which one is hinged and the other is sliding.

Reference numeral 3 indicates the female or middle member of the lock and reference numerals 4 and 5 represent the outside or top and bottom members of the female member of the lock. The member 3 is a box-like structure formed of four separate plates, 3*a* and 3*b* being the side members and 3*c* and 3*d* being the top and bottom members. These four members are formed of sheet steel or any other suitable metal and are welded together so as to form a hollow box-like structure.

The members 3*a* and 3*b* are welded to the lock-stile 2 of the gate and the members 3*c* and 3*d* can also be welded to the lock stile of the gate. The horizontal members 3*c* and 3*d* are each perforated with a slot indicated at 3*e*.

Fastened to the lock stile 1 are the two plates 4 and 5 which plates stand horizontally at right angles thereto and are welded to the stile. These plates each have an opening preferably rectangular therein indicated at 4*a* and 5*a*. The plates 4 and 5 stand in parallel relation to the plates 3*c* and 3*d* when the gate is closed or the gates are closed and the holes 4*a* and 5*a* are located so that they will stand in line with the holes 3*e* of the middle member when the gate or gates are closed. It will also be seen from an inspection of Figures 1 and 3 that the members 4 and 5 are spaced apart much further than the height or the up and down dimension of the male member shown in Figure 3. This is to give ample clearance between the male and female members so that the parts can come properly together regardless of expansion or contraction due to heat or cold or regardless of the settling of the gates or regardless of wear and tear.

Figure 3:
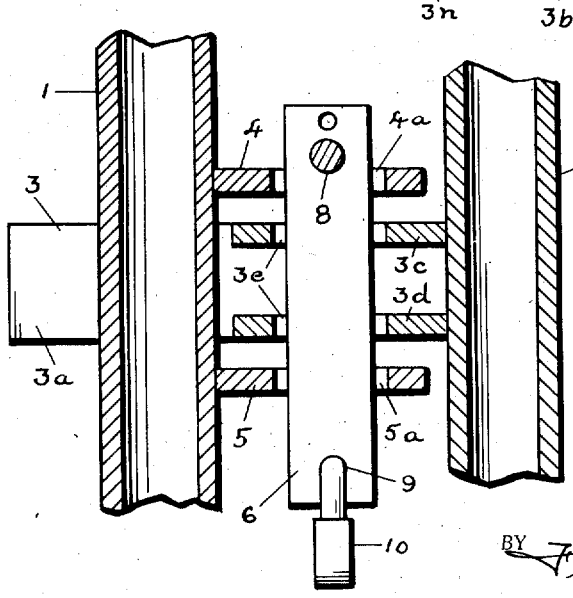
Figure 3 is a vertical section on the line 3*x*—3*x* of Figure 2 the chain being omitted.

When the gates are brought together the parts and the holes therein will be in alignment as shown in Figures 1 and 3 and then the locking bolt can be passed through the openings in the male and female members.

This locking bolt is indicated by the reference numeral 6 and is preferably fastened to one of the gates by a chain 7 although this chain can be omitted. A rod 8 is preferably welded in the top of the bolt 6 and forms a cross bar which limits the downward movement of it. This cross bar rests on the plate 4 when the bolt is in locking position so that the bolt can not be pulled down through the female and male members of the lock. The bottom of the bolt 6 is perforated as indicated at 9 to receive the keeper of a padlock 10 by which the bolt is permanently locked in place so that the gates will be kept closed.

The plates 3*a* and 3*b* are flared outwardly at the end as indicated at 3*m* and 3*n*. It is necessary to move both gates at the same time in closing the gates so that the lock stile 1 will engage between the flared ends 3*m* and 3*n* of the male members 3*a* and 3*b* and as the gates are swung into line with each other the lock stile 1 with the plates 4 and 5 moves into the position shown in Figures 2 and 3. This brings the holes 3*e* into line with the holes 4*a* and 5*a* so that the bolt 6 will easily pass through all the holes. It will also be understood that the lock stile 1 makes a rather close fit between the members 3*a* and 3*b* when the gates are closed.

Figure 4:
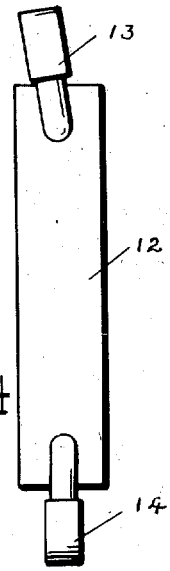
Figure 4 is a detail view of a locking bolt showing a padlock at each end of the bolt.

In Figure 4 I have shown a locking member 12 in which the chain is omitted at the top and which member is perforated with a hole at the top and bottom. In this case padlocks 13 and 14 are used at the top and bottom respectively. The upper padlock 13 keeps the bolt from being pulled down through the lock and the lower padlock 14 prevents the bolt from being pulled up through the lock. These padlocks will be different so that the key that unlocks the one will not unlock the other and this is desirable so that the one padlock can be unlocked by railroad men or the fire department or any other selected organization and the other lock can be unlocked by some one of the factory organization.

Figure 2:
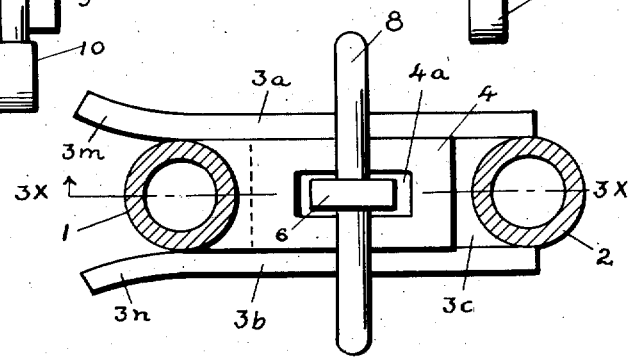
Figure 2 is a sectional view of Figure 1, the section being taken on the line 2*x*—2*x* of Figure 1, the chain being omitted.

In Figure 5 I have shown the two members of the lock 21 and 22 which are equivalent to the female and male members shown in Figures 1, 2 and 3. In this case, however, the member 21 and 22 are each made in a separate piece as a solid casting. The member 21 has a sleeve 21*a* therein which makes a sliding fit with the lock stile 1 of its gate or post and the member 22 has a sleeve 22*a* therein which makes a sliding fit with the stile 2 of its gate or the post on which it is placed. Each of these members is welded or fastened in any other suitable manner to the stile or post that supports it. The sleeve 21*a* or 22*a* can be slid up and down and provided with extending flanges through which a bolt or bolts can extend by which it can be clamped on its stile at any desired elevation thus providing for adjustment made necessary by changing conditions. On the member 21 are provided the two tongues 21*b* and 21*c* corresponding to the members 4 and 5 in Figure 1 and on the member 22 is provided the box-like portion 22*b* having the flared ends 22*c* and 22*d* corresponding to the similar part or the corresponding part on the members 1, 2 and 3. Each of the parts 21*b*, 21*c* and 22*b* is provided with the opening through which extends the locking bolt similar to the bolt 6 shown in Figure 1 or the bolt 12 shown in Figure 4.

As shown in Figure 6 the member 25 similar to the part 21 can be formed with a slit as indicated at 26 with the flanges 27 and 28 thereon which can be brought together by a bolt and nut 29. The interior surface 30 of this member can be formed roughened in any suitable manner so as to obtain a better grip on the stile that supports it.

This method of mounting or clamping can also be applied to the member 22.

In Figure 7, I have shown the sliding gate 40 which gate slides beside the fence. In this case the male or the female member can be fastened on the lock stile of the sliding gate and the other member can be fastened on the post. The member on the post will have its sleeve on the side of the locking member as shown in Figure 7 instead of on the end of it as shown in Figure 2 or Figure 5 so that the locking member comes in line with the travel of the gate.

In Figure 8 I have shown two sliding gates each of which travel parallel to the fence. These gates come together at the middle and use the locking devices shown in Figures 1, 2 and 3 or as shown in Figure 5. The gates may not necessarily be of equal length and each gate can be stopped in some suitable manner so that it cannot travel beyond its locked position.

In Figure 9 I have shown a diagrammatic view of a swinging gate in which the female locking member shown in Figures 2 and 5 is mutilated by having one of the extensions 3*a* or 3*b* in Figure 2 or one of the extensions 22*c* or 22*d* shown in Figure 5 omitted therefrom so that the gates may swing to closed position and be positively stopped in that position against a stationary post or against the stile of another gate which gate can be fastened independently in closed position in any suitable manner.

In such case the position of the male member and the female member of the lock can be reversed or alternated so that either gate can be opened independently.

I claim:

1. In a lock for double gates, said gates being placed in line with each other when closed, the combination of a lock stile on each of the two gates, said stiles being suitably spaced apart when the gates are in closed position, a female member having two horizontal plates fastened on the stile of one gate, a male member having two horizontal plates fastened on the stile of the other gate, the horizontal plates of the male member substantially spanning the opening between the two gates and extending between the two horizontal plates of the female member and extending toward the other gate, the male member having two upright plates enclosing the horizontal plates and extending beyond the horizontal plates of the member, and being adapted to embrace the stile of the other gate supporting the female member.

2. In a lock for double gates said gates being placed in line with each other when closed, the combination of a lock stile on each of the two gates said stiles being suitably spaced apart when the gates are in closed position, a female member having two horizontal plates fastened on the stile of one gate, a male member having two horizontal plates fastened on the stile of the other gate, the horizontal plates of the male member substantially spanning the opening between the two gates and extending between the two horizontal plates of the female member and extending toward the other gate, the male member having two upright plates enclosing the horizontal plates and extending beyond the horizontal plates of the member, and being adapted to embrace the stile of the other gate supporting the female member each of said members having a vertical hole extending therethrough, said holes standing in line with each other when the gates are closed, a locking bolt adapted to extend through the holes in both the male and female members and thereby locking the gates together, means for locking the locking bolt in place in the male and female members.

3. In a lock for double gates the combination of a lock stile on each of two gates said stiles being suitably spaced apart when the gates are in closed position, a female member having two horizontal plates fastened on the stile on one gate, a male member having two horizontal plates fastened on the stile of the other gate, the horizontal plates of the male member substantially spanning the opening between the two gates and extending between the two horizontal plates of the female member, the male member having two parallel plates standing in an upright position, the ends of said plates extending beyond the lock stile of the other gate and engaging said last named lock stile between them when the gates are in closed position.

4. In a lock for double gates the combination of a lock stile on each of two gates said stiles being suitably spaced apart when the gates are in closed position, a female member having two horizontal plates fastened on the stile of one gate, a male member having two horizontal plates fastened on the stile of the other gate, the horizontal plates of the male member substantially spanning the opening between the two gates and extending between the two horizontal plates of the female member, the male member having two parallel plates standing in an upright position, the ends of said plates extending beyond the lock stile of the other gate and engaging said last named lock stile between them when the gates are in closed position, the ends of said plates flaring outwardly and extending beyond the last named lock stile.

5. In a lock for a gate the combination of an upright supporting member, a female locking member supported thereon, an upright supporting member adjacent thereto, a male locking member supported thereon, the male locking member having two horizontal plates and two vertical plates formed in a box-like structure, the female member having two horizontal plates, all four of said horizontal plates having vertical holes therein, a locking bolt adapted to pass through the holes in the four horizontal plates and lock the male and female members together, said upright supporting members being suitably spaced apart with a substantial opening between them when the male and female members of the lock are brought together, the male member spanning the opening between the two upright supporting members and stopping short of the other supporting member, said parts being so arranged that the lock is accessible from either side of the gate through the opening between the upright members.

6. In a lock for a gate the combination of an upright supporting member, a female locking member supported thereon, an upright supporting member adjacent thereto, a male locking member supported thereon, the male locking memebr having two horizontal plates and two vertical plates formed in a box-like structure, the female member having two horizontal plates, all four of said horizontal plates having vertical holes therein, a locking bolt adapted to pass through the holes in the four horizontal plates and lock the male and female members together, the male member having upright outwardly flaring extensions thereon adapted to engage both sides of the supporting member of the female member.

7. In a lock for a gate the combination of a lock stile and a lock stile adjacent thereto, one of said stiles being on the gate, a male locking member rigidly mounted on one of said stiles and a female locking member rigidly mounted on the other of said stiles, the female member having two horizontal plates one above the other, the male locking member having a horizontal plate adapted to engage between the horizontal plates of the female member, all of said horizontal plates having vertical holes therein that stand in line with each other when the gate is in line with the other stile and is in locking engagement therewith, a locking bolt adapted to pass through the holes of all of the horizontal plates and lock the male and female members together, one of said members having outwardly flaring extensions thereon and rigid with the stile that supports it, said outwardly flaring extensions being adapted to engage both sides of the stile that supports the other member for the purpose of locking the one stile to the stile of the gate.

8. In a lock for a gate the combination of an upright supporting member, a female locking member supported thereon comprising two horizontal plates suitably spaced apart, a second upright supporting member adjacent thereto, a male locking member on said second upright supporting member and having one or more horizontal plates adapted to engage between the plates of the female member, all of said horizontal plates having vertical holes therein, a locking bolt adapted to pass through the holes in all of the horizontal plates and lock the male and female members together, the male member having outwardly flaring extensions thereon adapted to engage both sides of the upright supporting member of the female member, said locking bolt being located between the upright supporting members and standing parallel to them, one of said upright supporting members forming part of a gate.

CHARLES R. DRAY.

REFERENCES CITED

The following references are of record in the file of this patent:

UNITED STATES PATENTS

| Number | Name | Date |
|---|---|---|
| 1,020,721 | Snyder | Mar. 19, 1912 |
| 1,202,733 | Kilmer | Oct. 24, 1916 |
| 1,216,314 | Henkle | Feb. 20, 1917 |
| 1,226,000 | Olson | May 15, 1917 |
| 1,259,859 | Harsen | Mar. 19, 1918 |
| 1,322,883 | Drew | Nov. 25, 1919 |
| 1,351,117 | Newhall | Aug. 31, 1920 |
| 1,834,678 | Bryant | Dec. 1, 1931 |